United States Patent
Muhr et al.

[11] 3,871,192
[45] Mar. 18, 1975

[54] FORKED UNIVERSAL JOINT MEMBER

[75] Inventors: Heinrich Muhr, Dusseldorf;
Wolfgang Sprenger, Mettmann;
Franz-Dieter Schnitzler,
Duesseldorf-Oberkassel; Adolf
Degenkolbe, Meerbusch; Hans
Willemsen, Neuss-Reuschenberg;
Horst Bruss, Solingen; Willy
Blumberg, Dusseldorf-Oberkassel;
Manfred Belsdorf, Meerbusch; all of
Germany

[73] Assignee: A. Ehrenreich & Cie., Dusseldorf, Germany

[22] Filed: Nov. 7, 1973

[21] Appl. No.: 413,446

[30] Foreign Application Priority Data
Nov. 18, 1972 Germany.............................. 2256726

[52] U.S. Cl.......................... 64/17 R, 64/1 R, 64/6, 403/378
[51] Int. Cl.............................................. F16d 3/26
[58] Field of Search........ 64/17 R, 17 SP, 6, 4, 1 R; 403/373, 378, 379

[56] References Cited
UNITED STATES PATENTS

| 1,121,962 | 12/1914 | Williston............................. 403/378 |
| 2,278,698 | 4/1942 | Green..................................... 64/1 |
| 2,678,550 | 5/1954 | Caldwell, Jr.......................... 64/1 S |
| 2,910,842 | 11/1959 | Senserig................................... 64/4 |

FOREIGN PATENTS OR APPLICATIONS
1,161,753  8/1969  United Kingdom.............. 64/17 R Primary Examiner—Samuel Scott
Assistant Examiner—Randall Heald
Attorney, Agent, or Firm—Ernest F. Marmorek

[57] ABSTRACT

A forked member for a universal joint has a forked portion for being engaged in the universal joint and a clamp-like member that may form an integral part with the forked portion to permit the detachable securing of a shaft to the forked member.

2 Claims, 3 Drawing Figures

3,871,192

FORKED UNIVERSAL JOINT MEMBER

DESCRIPTION OF THE INVENTION

The invention relates to a forked member of a universal joint that has a forked portion for engagement in the universal joint and a clamp-like member for detachably securing a shaft to the forked member.

Such forked members may, for example, be forged, stamped, or formed from sheet metal, in some cases in multipartite form, as is disclosed for example in the German Gebrauchsmuster — No. 7,137,425. Most of these forked members, however, have in common the disadvantage that during the tightening of the clamp-like member, the sides of the shaft are in contact with the forked portion. As a result, the quality of the seating of the universal joint within the prongs of the forked member depends on the quality of the fit and the clamping conditions between the connecting clamp-like member and the shaft. This results from the fact that improper fit or clamping conditions can result in the deformation of the forked member.

The German patent application Ser. No. 1,907,215, which has been open to inspection, on the other hand, describes a telescopic shaft with individual pipe sections on which there are axial guide members in the form of longitudinal ribs or fins. When tightening the clamp-like member of that type, however, the pipe segments are also subjected to the undesirable stresses which result in deformation with the attendant danger of creating imbalances as a result of the deformation.

It is therefore one of the principal objects of the invention to eliminate the aforesaid detrimental deformation of the forked member caused by the clamping of a shaft to it. This, broadly speaking, is accomplished by the use of a simple universal joint fork which has been produced from a single pipe segment. The objects of this invention are attained, according to a preferred embodiment, in that an ovally deformed or flattened or otherwise similarly deformed pipe is constructed on the one side in the form of a forked portion having a multiplicity of prongs, and on the other side with a longitudinal slot and bore holes located to permit an attachment member to be located transversely with respect to the slot.

Further objects and advantages of the invention will be obvious from the following specification.

With the above and other objects of the invention in view, the invention consists in the novel construction of the clamp-like and forked portions in combination as an integral structure in a universal joint, whereby deformation of the forked member caused by clamping a shaft to it, is resisted.

The invention accordingly comprises the features of the construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 2:
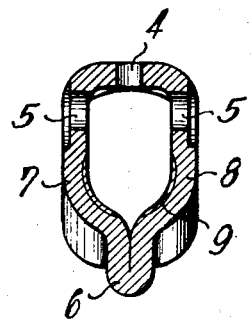
FIG. 2 is a sectional view taken on the line II—II of FIG. 1.
Figure 1:
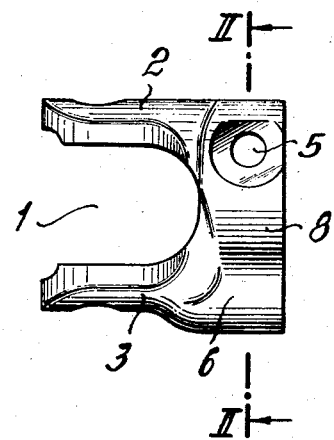
FIG. 1 is a side elevational view of a forked member in accordance with the present invention.

In carrying the invention into effect in the embodiments which have been selected for illustration in the accompanying drawings and for description in this specification, and referring now particularly to FIGS. 1 and 2, each forked member includes a flattened or ovally or otherwise similarly deformed pipe segment and is produced by stamping or milling of two cut-out sections 1 from one end portion of the pipe. There are thereby provided two prongs, numbered 2 and 3. On the other end portion of the pipe and aligned with the center point of one of the fork sides, namely the prong 2, there is located a longitudinal slot 4. Bore holes 5 are located near the longitudinal slot 4 which permit an attachment member, such as for example a bolt (not shown), to extend transversely with respect to the slot 4.

To facilitate the centering of the forked member on a shaft (not shown) to which it is to be secured, there is provided a longitudinal fold 6 located in line with the prong 3. This fold serves as a bearing member for the shaft to locate and maintain it in parallel alignment with the fork during and after clamping of the shaft. The shaft is thus held between this fold 6 and the attachment member such as the bolt which is introduced in transversal direction to slot 4 through the bore holes 5.

Thus the shaft is held perpendicular to and by the two jaws 7 and 8, of the clamp-like portion, which are separated by the slot 4 and clamped together by an attachment member passing through the bore holes 5.

The slot 4 acts to prevent a deformation of the fork prongs 2 and 3 during the clamping of the jaws 7 and 8 by the attachment member.

In order to provide a better connection with the shaft, the area 9 (FIG. 2) may be threaded to permit screwing of the shaft into the pipe, or the pipe may possess longitudinal grooves or similar constructions (not shown) to increase the frictional forces between the pipe and the shaft.

Figure 3:
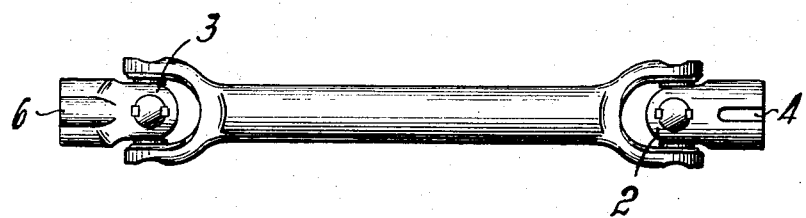
FIG. 3 is a plan view of a universal joint with two forked members designed according to the present invention.

The embodiment of a double universal joint as shown in FIG. 3, has a central portion, with crosspieces on opposite ends. Forked universal joint members, as shown in FIGS. 1 and 2 and described above, engage each of the crosspieces to form a universal joint.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A forked member, for use in a universal joint and permitting detachable connection to a shaft, comprising, in combination, a deformed pipe, having first and second end portions and defining near said first end portion a forked part including prongs adapted to be engaged in a universal joint;

said pipe further defining near said second end portion a clamp-like member adapted to clamp detachably the shaft in proper alignment with said forked part while resisting deformation thereof, said clamp-like member comprising:

a longitudinal fold extending from said second end toward said first end;

said pipe further defining a longitudinal slot extending from said second end toward said first end and being open at said second end; and said ovally deformed pipe further defining a multiplicity of bore holes adapted to permit an attachment element in transversal direction to said slot.

2. A forked member, as claimed in claim 1 wherein:
a. said forked part defines a first and a second prong;
b. said first prong being located on the opposite side of said first end from said second prong;
c. said longitudinal fold is aligned with the center of said first prong; and
d. said longitudinal slot is aligned with the center of said second prong.

* * * * *